May 4, 1943.　　　　F. MESINGER　　　　2,318,246
CYCLE SADDLE
Filed Dec. 12, 1938
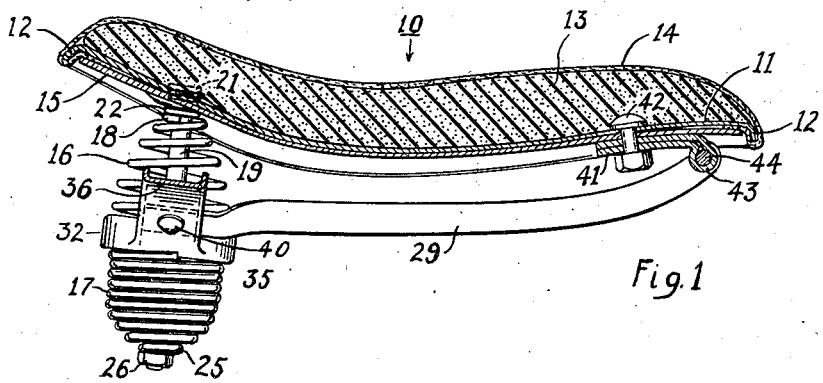
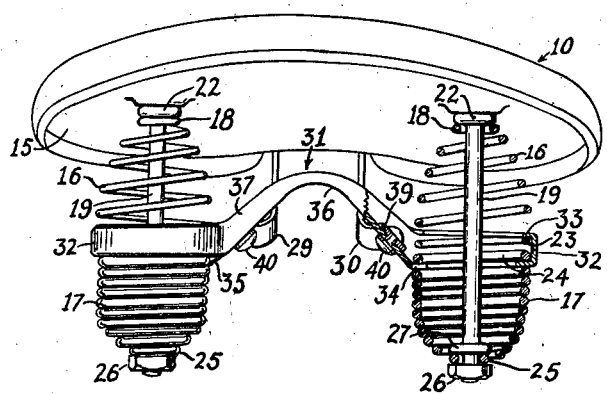
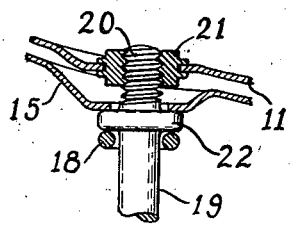
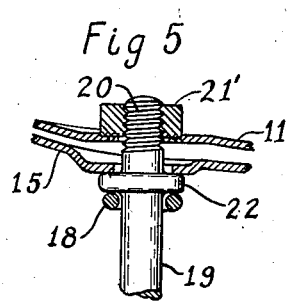
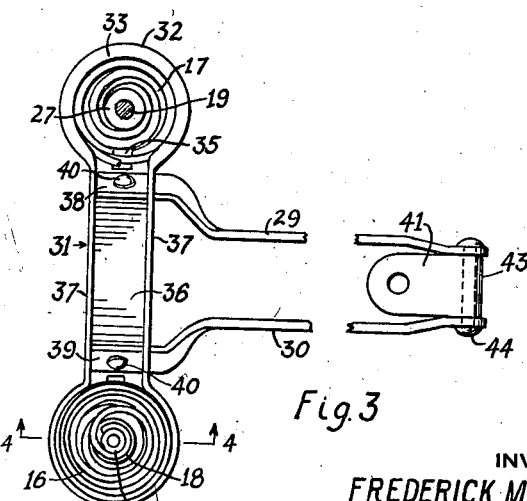
INVENTOR
FREDERICK MESINGER
BY
William F. Mesinger
ATTORNEY Patented May 4, 1943

2,318,246

UNITED STATES PATENT OFFICE 2,318,246

CYCLE SADDLE

Frederick Mesinger, Mount Vernon, N. Y.

Application December 12, 1938, Serial No. 245,087

4 Claims. (Cl. 155—5.22)

This invention relates to resilient supports for cycle saddles and has for its principal object to provide an improved arrangement for supporting a saddle seat by coil springs which is highly efficient and is economical to manufacture.

It is a further object to provide an improved coil spring securing arrangement for cycle saddles which eliminates the need of a yoke and hinges.

It is also a particular object to provide an improved saddle supporting device in which the means for connecting compound springs to the seat base secures the seat base structure in a highly efficient and economical manner.

Other objects of the invention will in part be obvious and will in part appear hereinafter.

The invention accordingly comprises the features of construction, combination of elements, and arrangements of parts, which will be exemplified in the construction hereinafter set forth and the scope of the application of which will be indicated in the claims.

For a fuller understanding of the nature and objects of the invention reference should be had to the following detailed description taken in connection with the accompanying drawing, in which:

Fig. 1 is a longitudinal sectional view of a saddle having an exemplary spring structure according to the invention;

Fig. 2 is a rear elevational view of the saddle shown in Fig. 1 having parts of one spring broken away;

Fig. 3 is a plan view of the supporting frame of the saddle shown in Fig. 1 with parts broken away;

Fig. 4 is an enlarged fragmentary view of a section taken on the line 4—4 of Fig. 3 showing the spring pillar and seat base connection according to the invention; and Fig. 5 is a similar enlarged fragmentary view showing an alternative form of spring pillar and seat base connection.

A compound arrangement of coil springs for supporting bicycle saddle seats which has been widely used employs the resilient characteristics of two types of coil springs which are connected to the supporting frame and the saddle seat in such a manner that the lower spring is placed in tension and the upper spring which is usually conical, is placed in compression by the weight of the bicycle rider. The upper end of the conical spring bears against the saddle seat and the lower end of the extension spring is customarily secured to the lower ends of the legs of a yoke which extends axially through the springs. The yoke is expensive to manufacture, requires the use of extra bolts and hinges which may rattle if loose or squeak if tight and tends to allow the springs to swing out of proper position.

By the present invention these and other objections are avoided by providing an improved arrangement for securing the springs to the frame whereby the customary yoke is eliminated with its disadvantages by providing a spring pillar that maintains the springs in alignment and also secures together portions of the seat base providing a simple and efficient connection between springs and base.

Referring now to the drawing and particularly to Fig. 1, a saddle is shown having a seat portion, indicated generally at 10, which comprises a pressed sheet metal base 11 having a downwardly formed edge flange 12. A sponge rubber cushion 13 is disposed on the upper surface of the base and is covered by a preformed leather top covering 14 having edge portions which are passed around and completely enclose the edge flange 12. A sheet metal bottom plate 15 formed to engage in substantially complete contact with the bottom surface of the base 11 and whose edges are shaped to fit within the flange 12 is provided and secured to the bottom surface of the base 11 so as to clamp the edge portions of the cover 14 between the edges of plate 15 and the flange 12. The cover 14 is thus retained tightly in place and a seat having a smooth edge is provided.

The seat is supported by the improved spring structure which comprises two pairs of coil springs disposed below the rear portion of the seat. Each pair consists of an upper compression spring 16 having coils normally spaced apart and a lower extension spring 17 having coils normally close together, both springs being axially aligned. The coils of the upper spring 16 preferably are smaller in diameter toward the upper end, the last coil 18 being small enough to closely encircle the upper portion of a substantially vertical spring pillar or rod 19 which passes axially through the two springs. The pillar 19 is provided with a threaded upper end portion 20 below which is formed an integral collar 22. The threaded portion 20 passes through both the plate 15 and the base 11 and engages with a nut 21 secured to the upward side of the base 11. The base 11 and plate 15 are thereby tightly clamped together between the nut 21 and the collar 22. The nut is preferably secured to the base 11 as shown in Fig. 4 by disposing the nut in a closely fitting hexagonal hole and riveting over peripheral portions of the nut against each face of the base 11. Other means for securing the nut to the base may be employed if desired, for example as shown in Fig. 5 the nut 21' may be electrically welded to the upper surface of the base 11. As shown, the plate 15 is formed with a flat portion in the region surrounding the threaded portion 20 in order to engage squarely with the collar 22 and firmly support the pillar 19. The coil 18 of the spring 16 engages against the collar 22.

The lower coil 23 of the spring 16 and the upper coil 24 of spring 17 are of the same diameter and closely adjacent each other; they may, if desired, be in contact with each other or they may be continuous. The lower coils of spring 17 are smaller in diameter, the last coil 25 encircling the lower end of the axially disposed pillar 19 and being secured thereto between a nut 26 threadedly engaging the end portion of the rod and another integral collar 27 on the upper side of coil 25.

The two springs 16 and 17 are secured together and to frame or reach members 29 and 30 by a transverse or bridge member 31. The member 31 has ring portions 32 which encircle or surround the coils 23 and 24. The upper and lower rims of the ring 32 are provided with inwardly projecting flanges 33 and 34, the lower flange 34 projecting under coil 24 and the upper flange 33 projecting over coil 23. The coils 23 and 24 are thus secured together within the ring 32 concentrically and without a substantial gap therebetween. A portion of the flange 34 preferably nearest the reach members 29 as clearly shown in Fig. 3, the left compression spring being removed, is cut away to provide an opening 35 thru which the spiral wire of spring 17 may pass. The ring portions 32 are rigidly joined by an arch shaped portion 36 having upturned edges 37 provided to stiffen the arch, the edges 37 being continuous with the rings 32.

The reach members 29 and 30 are formed from rectangular bars having longitudinally disposed parallel portions whose width dimension is vertical and which are spaced apart a distance suitable for support upon a seat pillar by means of a suitable clamp. The rear portions 38 and 39 are offset outwardly and twisted at an angle to the parallel portions of the reach members, the angle being such that the end portions 38 and 39 are parallel to the under side walls of the arch 36 respectively. The portions 38 and 39 pass through slots cut in the forward flanges 37 of the arch and are secured to the arch adjacent the ring portions 32 each by a single rivet 40. The forward portions of the members 29 and 30 are upwardly curved and the ends are hingedly secured to the pommel portion of the seat base 11 and plate 15 by means of a hinge clip 41 secured thereto by a bolt 42. The clip 41 has a transverse horizontal loop 43 and the members 29 and 30 are secured to the ends of a rivet 44 passing through the loop.

The weight of the rider causes the rear portion of seat 10 to be depressed, compressing springs 16 between the collars 22 and the upper coils 24 of springs 17 which are supported on the flanges 34 of the bridge member 31. Simultaneously the rods 19 carry the lower end coils of springs 17 downward, stretching springs 17 between the collars 27 and the flanges 34. Both springs resist this deflection with a reaction peculiar to their respective shapes and thickness of wire. The upper or compression spring is preferably made of thinner wire although it may be desirable to use wire of equal thickness, for example, the upper and lower springs may be formed of a single continuous piece of wire, the upper portion being openly coiled and the lower portion closely coiled. The frame members 29 and 30 move rigidly with the vehicle which supports them while the seat 10 pivots about the axis of pin 44 to allow the rear portion of the seat to move with respect to the bridge member 31.

It will be seen that the full length of the springs is usefully employed to provide resilience and that there is no inactive gap between them. The loading of the springs is concentric so that the upper spring can cooperate with the lower throughout the full range of movement. With a concentric arrangement, the upper springs effectively prevent the lower springs from being overloaded for excessive downward motion of the seat will be stopped by the closing up of the coils of the upper springs.

The pillars 19 serve to secure the base 11 and bottom plate 15 tightly together so as to clamp the top covering 14 firmly in place and this manner of securing the spring pillars 19 to the base provides them with a desired degree of stiffness so that the fore and aft displacement of the springs from a substantially vertical position is effectively prevented.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent, is:

1. A bicycle saddle comprising a seat portion having a sheet metal base, a top covering of flexible sheet material having its edge portions extending around the peripheral edges of said base and against the under side thereof, a bottom plate secured against the bottom of said base for clamping the edge portions of said top covering against the base, a pair of internally threaded nuts secured at laterally spaced points of the rear portion of said base, a supporting frame, a pair of compound seat supporting springs secured at their mid portions to said supporting frame, and pillars extending downwardly from said base, said pillars having threaded upper ends passing through openings in said bottom plate registering with the openings of said nuts and engaging the threads of said nuts and each having an integral collar bearing against said bottom plate for securing said bottom plate against the base, the upper ends of said compound springs each surrounding one of said pillars and bearing against said collars, and the lower ends of said springs being secured to the lower ends of said pillars.

2. A bicycle saddle comprising a sheet metal base, a bottom plate against the bottom face of said base, a pair of internally threaded nuts near the rear of said base firmly secured thereto, openings through said bottom plate registering with the openings of said nuts, said bottom plates having flat depressed portions about said openings, a pair of pillars having upper portions threadedly engaging said nuts and integral collars adjacent said threaded portions engaging with said depressed portions for securing said bottom plate to said base, a pair of helical springs surrounding said pillars and having their lower ends secured to the lower ends of said pillars, and a supporting frame movably connected to the forward portion of said base and connected to and operatively supporting said pair of springs.

3. A bicycle saddle as claimed in claim 2 in which said supporting frame includes a transverse bridge member having integral end portions surrounding said springs and provided with inwardly projecting flanges making threaded engagement with the intermediate coils of said springs.

4. A bicycle saddle comprising a seat portion having a sheet metal base, a top covering of flexible sheet material having its edge portions extending around the peripheral edges of said base and against the under side thereof, a bottom plate secured against the bottom of said base for clamping the edge portions of said top covering against the base, a pair of internally threaded nuts secured at laterally spaced points of the rear portion of said base, two pillars extending downwardly from said base, said pillars each having threaded upper ends passing through openings in said bottom plate and engaging said nuts and said pillars each having an integral collar bearing against said bottom plate for securing said bottom plate against said base, a spring supporting frame, and helical springs surrounding said pillars, said springs being secured between said frame and the respective pillars.

FREDERICK MESINGER.